United States Patent
Zhang et al.

(10) Patent No.: US 9,094,691 B2
(45) Date of Patent: Jul. 28, 2015

(54) METHODS OF UTILIZING TABLES ADAPTIVELY UPDATED FOR CODING/DECODING AND RELATED PROCESSING CIRCUITS THEREOF

(75) Inventors: Kai Zhang, Beijing (CN); Shaw-Min Lei, Hsinchu County (TW)

(73) Assignee: MediaTek Singapore Pte. Ltd., Solaris, Singapore (SG)

( * ) Notice: Subject to any disclaimer, the term of this patent is extended or adjusted under 35 U.S.C. 154(b) by 734 days.

(21) Appl. No.: 13/017,041

(22) Filed: Jan. 30, 2011

(65) Prior Publication Data
US 2012/0027084 A1    Feb. 2, 2012

Related U.S. Application Data

(60) Provisional application No. 61/314,112, filed on Mar. 15, 2010.

(51) Int. Cl.
| | |
|---|---|
| H04N 7/12 | (2006.01) |
| H04N 11/02 | (2006.01) |
| H04N 11/04 | (2006.01) |
| G06K 9/36 | (2006.01) |
| G06K 9/46 | (2006.01) |
| H03M 7/00 | (2006.01) |
| H04N 19/93 | (2014.01) |
| H04N 19/196 | (2014.01) |
| H04N 19/463 | (2014.01) |

(52) U.S. Cl.
CPC ............. *H04N 19/93* (2014.11); *H04N 19/196* (2014.11); *H04N 19/463* (2014.11)

(58) Field of Classification Search
USPC ..................................................... 375/240.12
See application file for complete search history.

(56) References Cited

U.S. PATENT DOCUMENTS

| | | | | |
|---|---|---|---|---|
| 5,357,250 | A  * | 10/1994 | Healey et al. .................. | 341/107 |
| 8,311,119 | B2 * | 11/2012 | Srinivasan ............... | 375/240.18 |
| 2003/0138150 | A1 * | 7/2003 | Srinivasan ................... | 382/238 |
| 2003/0169816 | A1 * | 9/2003 | Wang et al. .............. | 375/240.12 |

FOREIGN PATENT DOCUMENTS

CN            1798341 A         7/2006

* cited by examiner

*Primary Examiner* — Hee-Yong Kim
(74) *Attorney, Agent, or Firm* — Winston Hsu; Scott Margo

(57) ABSTRACT

A method of converting first data into second data includes: determining a target symbol corresponding to the first data by utilizing a determining unit; and generating the second data corresponding to the determined target symbol. One of the first data and the second data is a syntax element, and the other of the first data and the second data is an entropy-coded result of the syntax element. The target symbol corresponding to the first data is determined adaptively according to occurrence probability of candidate syntax element values of the syntax element.

12 Claims, 14 Drawing Sheets

| Index value (n) | Syntax element value (M[n]) | Symbol | |
|---|---|---|---|
| 0 | 2 | S0 | ~201 |
| 1 | 0 | S1 | ~202 |
| 2 | 3 | S2 | ~203 |
| 3 | 1 | S3 | ~204 |

| Index value (n) | Occurrence probability indication value (P[n]) | |
|---|---|---|
| 0 | 4 | ~301 |
| 1 | 3 | ~302 |
| 2 | 2 | ~303 |
| 3 | 1 | ~304 |

| Index value (n) | Occurrence probability indication value (P[n]) | |
|---|---|---|
| 0 | 4 | ~301 |
| 1 | 4 | ~302 |
| 2 | 2 | ~303 |
| 3 | 1 | ~304 |

| Index value (n) | Occurrence probability indication value (P[n]) | |
|---|---|---|
| 0 | 4 | ~301 |
| 1 | 5 | ~302 |
| 2 | 2 | ~303 |
| 3 | 1 | ~304 |

PT

| Index value (n) | Occurrence probability indication value (P[n]) | |
|---|---|---|
| 0 | 5 | ~301 |
| 1 | 4 | ~302 |
| 2 | 2 | ~303 |
| 3 | 1 | ~304 |

FIG. 6

| Index value (n) | Syntax element value (M[n]) | Symbol | |
|---|---|---|---|
| 0 | 0 | S0 | ~201 |
| 1 | 2 | S1 | ~202 |
| 2 | 3 | S2 | ~203 |
| 3 | 1 | S3 | ~204 |

| Scanning index value (n) | Position value (OT[n]) | |
|---|---|---|
| 0 | (0,0) | ~1002 |
| 1 | (1,0) | ~1004 |
| 2 | (0,1) | ~1006 |
| 3 | (0,2) | ~1008 |
| ⋮ | ⋮ | |

| Scanning index value (n) | Statistic value (ST[n]) | |
|---|---|---|
| 0 | 10 | ~1102 |
| 1 | 10 | ~1104 |
| 2 | 8 | ~1106 |
| 3 | 7 | ~1108 |
| ⋮ | ⋮ | |

ST

| Scanning index value (n) | Statistic value (ST[n]) | |
|---|---|---|
| 0 | 10 | ~1102 |
| 1 | 11 | ~1104 |
| 2 | 8 | ~1106 |
| 3 | 7 | ~1108 |
| ⋮ | ⋮ | |

FIG. 12

| Scanning index value (n) | Statistic value (ST[n]) | |
|---|---|---|
| 0 | 11 | ~1102 |
| 1 | 10 | ~1104 |
| 2 | 8 | ~1106 |
| 3 | 7 | ~1108 |
| ⋮ | ⋮ | |

— # METHODS OF UTILIZING TABLES ADAPTIVELY UPDATED FOR CODING/DECODING AND RELATED PROCESSING CIRCUITS THEREOF

CROSS REFERENCE TO RELATED APPLICATIONS

This application claims the benefit of U.S. provisional application No. 61/314,112, filed on Mar. 15, 2010 and incorporated herein by reference.

BACKGROUND

The disclosed embodiments of the present invention relate to image processing, and more particularly, to methods of utilizing tables adaptively updated for coding/decoding and related processing circuits thereof.

Regarding the video coding, a prediction block may be found in an intra-prediction mode. A prediction residue is derived from a difference between the found prediction block and a block to be encoded. Next, a transform (e.g., a block-based transform) operation is performed for transforming the prediction residue into a transform domain, and then a quantization operation is applied to a transform result. As a result, a two-dimensional matrix consisted of quantized transform coefficients is generated. The quantized transform coefficients are required to be coded as compactly as possible prior to storage and transmission. As the quantized transform coefficients include a few non-zero coefficients and a large number of zero-valued coefficients, reordering the quantized transform coefficients for grouping together non-zero coefficients is performed prior to the entropy coding. A scanning order is therefore required for converting the two-dimensional coefficient matrix into a one-dimensional coefficient array which has quantized transform coefficients reordered to group together non-zero coefficients. Regarding the video decoding, the same scanning order should be maintained and used for converting the one-dimensional coefficient array into the two-dimensional coefficient matrix for further entropy decoding. To put it simply, as the performance of grouping together non-zero coefficients depends upon the scanning order, how to properly set the scanning order becomes an important issue for designers in the pertinent field.

The entropy coding is widely needed in the video coding. For example, syntax elements, such as macroblock type, intra-prediction mode, transform coefficients, etc., are coded into an entropy-coded bitstream suitable for transmission and storage. Regarding a particular coding scenario, syntax elements are coded into codewords directly. However, such a coding manner may not be suitable for all possible coding scenarios. Regarding the entropy decoding widely needed in the video decoding, a proper decoding manner should be used for directly decoding the codewords into syntax elements. Similarly, such a decoding manner may not be suitable for all possible decoding scenarios. Thus, there is a need for a universal entropy coding/decoding method which can be applied to any coding/decoding scenario.

SUMMARY OF THE INVENTION

In accordance with exemplary embodiments of the present invention, methods of utilizing tables adaptively updated for coding/decoding and related processing circuits thereof are proposed to solve the above-mentioned problem.

According to a first aspect of the present invention, an exemplary method of converting first data into second data is disclosed. The exemplary method includes: determining a target symbol corresponding to the first data by utilizing a determining unit; and generating the second data corresponding to the determined target symbol. One of the first data and the second data is a syntax element, and the other of the first data and the second data is an entropy-coded result of the syntax element. The target symbol corresponding to the first data is determined adaptively according to occurrence probability of candidate syntax element values of the syntax element.

According to a second aspect of the present invention, an exemplary method of converting prediction residue data into a coefficient array is disclosed. The exemplary method includes: utilizing a processing unit for generating a plurality of coefficient matrixes by performing a plurality of image processing operations upon a plurality of portions of the prediction residue data, respectively, wherein the image processing operations include different transforms, respectively, and the prediction residue data corresponds to a difference between a block to be coded and a prediction block under a single prediction mode; and generating the coefficient array by applying a plurality of different scanning orders to the coefficient matrixes, respectively.

According to a third aspect of the present invention, an exemplary method of converting a coefficient array into prediction residue data is disclosed. The exemplary method includes: generating a plurality of coefficient matrixes by applying a plurality of different scanning orders to a plurality of portions of the coefficient array, respectively; and utilizing a processing unit for generating the prediction residue data by performing a plurality of image processing operations upon the coefficient matrixes, respectively. The image processing operations include different inverse transforms, respectively, and the prediction residue data corresponds to a difference between a block to be decoded and a prediction block under a single prediction mode.

According to a fourth aspect of the present invention, an exemplary method of recording a scanning order for a transform is disclosed. The exemplary method includes: providing an order table which records the scanning order by storing a plurality of position values indexed by a plurality of scanning index values, respectively, wherein the position values are indicative of positions in a coefficient matrix corresponding to the transform; and each time one coefficient is processed according to the scanning order recorded by the order table, determining whether to update the order table by utilizing an updating module.

According to a fifth aspect of the present invention, an exemplary processing circuit of converting first data into second data is disclosed. The exemplary processing circuit includes a determining unit and a processing unit. The determining unit is used for determining a target symbol corresponding to the first data. The processing unit is coupled to the determining unit, and used for generating the second data corresponding to the determined target symbol. One of the first data and the second data is a syntax element, and the other of the first data and the second data is an entropy-coded result of the syntax element. The determining unit determines the target symbol corresponding to the first data adaptively according to occurrence probability of candidate syntax element values of the syntax element.

According to a sixth aspect of the present invention, an exemplary processing circuit of converting prediction residue data into a coefficient array is disclosed. The processing circuit includes a processing unit and a reordering unit. The processing unit is used for generating a plurality of coefficient matrixes by performing a plurality of image processing operations upon a plurality of portions of the prediction residue data, respectively, wherein the image processing operations include different transforms, respectively, and the prediction residue data corresponds to a difference between a block to be encoded and a prediction block under a single prediction mode. The reordering unit is coupled to the processing unit, and used for generating the coefficient array by applying a plurality of different scanning orders to the coefficient matrixes, respectively.

According to a seventh aspect of the present invention, an exemplary processing circuit of converting a coefficient array into prediction residue data is disclosed. The exemplary processing circuit includes a reordering unit and a processing unit. The reordering unit is used for generating a plurality of coefficient matrixes by applying a plurality of different scanning orders to a plurality of portions of the coefficient array, respectively. The processing unit is coupled to the reordering unit, and used for generating the prediction residue data by performing a plurality of image processing operations upon the coefficient matrixes, respectively. The image processing operations include different inverse transforms, respectively, and the prediction residue data corresponds to a difference between a block to be decoded and a prediction block under a single prediction mode.

According to an eighth aspect of the present invention, an exemplary processing circuit of recording a scanning order for a transform is disclosed. The exemplary processing circuit includes a storage and an updating module coupled to the storage. The storage is used for providing an order table which records the scanning order by storing a plurality of position values indexed by a plurality of scanning index values, respectively, wherein the position values are indicative of positions in a coefficient matrix corresponding to the transform. Each time one coefficient is processed according to the scanning order recorded by the order table, the updating module determines whether to update the order table.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram illustrating yet another exemplary embodiment of the updated probability table according to the present invention.

FIG. 12 is a diagram illustrating an exemplary embodiment of an updated statistic table according to the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
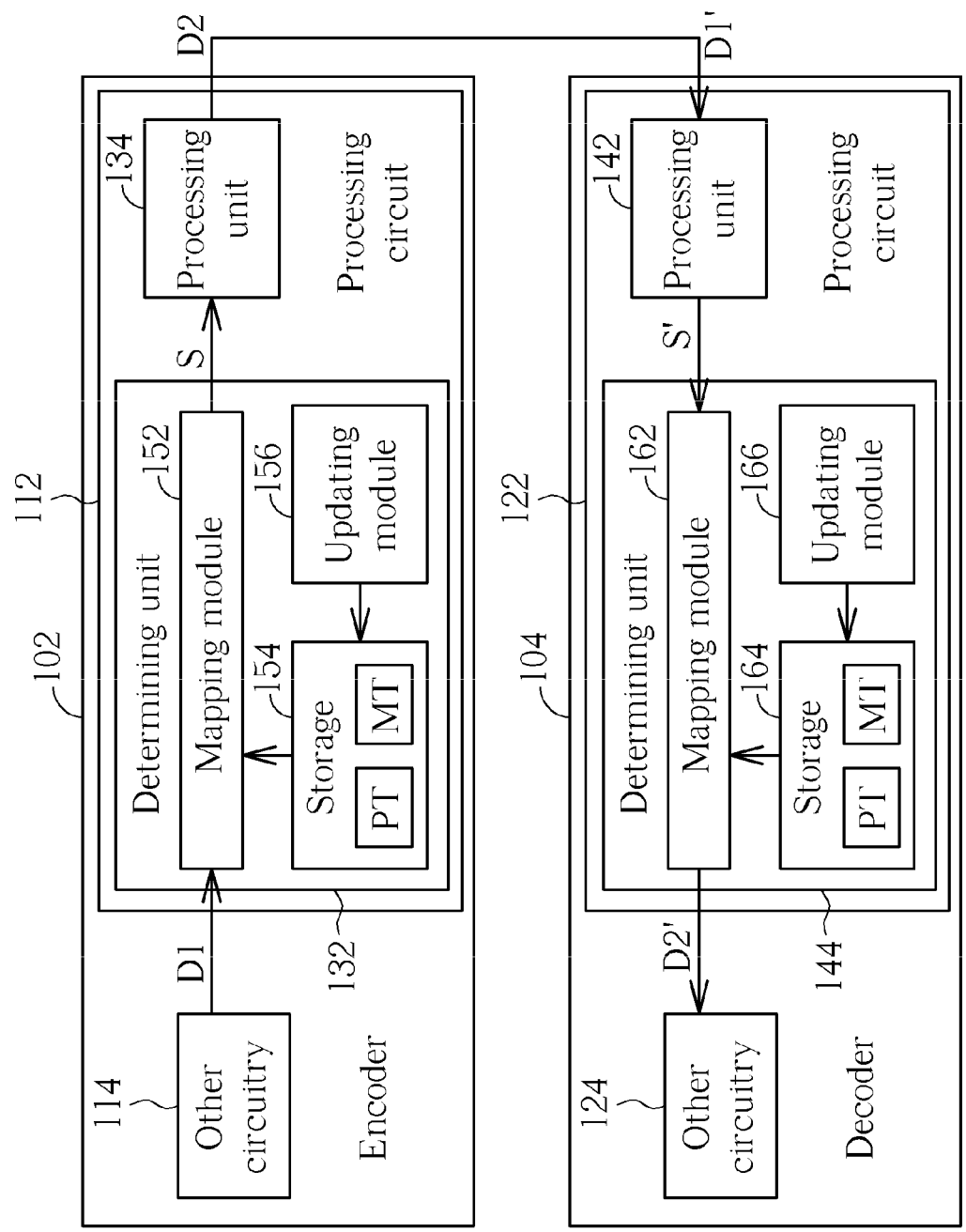
FIG. 1 is a block diagram illustrating an image processing system according to an exemplary embodiment of the present invention.

FIG. 1 is a block diagram illustrating an image processing system according to an exemplary embodiment of the present invention. The image processing system 100 includes an encoder 102 and a decoder 104, wherein the encoder 102 includes a processing circuit 112 and other circuitry 114 for realizing the designated functionality of the encoder 102, and the decoder 104 includes a processing circuit 122 and other circuitry 124 for realizing the designated functionality of the decoder 104. In this exemplary embodiment, the processing circuit 112 may be an entropy coding circuit, and the processing circuit 122 may be an entropy decoding circuit. As shown in FIG. 1, the processing circuit 112 includes a determining unit 132 used for determining a target symbol S corresponding to first data D1, and a processing unit 134 coupled to the mapping unit 132 for generating second data D2 corresponding to the determined target symbol S. Regarding the processing circuit 122, it includes a determining unit 142 used for determining a target symbol S' corresponding to first data D1', and a processing unit 144 coupled to the determining unit 142 for generating second data D2' corresponding to the determined target symbol S'. Regarding the encoder 102, the first data D1 is a syntax element, and the second data D2 is an entropy-coded result of the syntax element. Regarding the decoder 104, the first data D1' is an entropy-coded result of a syntax element, and the second data D2' is the syntax element. Ideally, when the first data D1' is the second data D2, the determined target symbol S' generated in the decoder 104 would be the determined target symbol S generated in the encoder 102, and the second data D2' generated in the decoder 104 would be the first data D1 processed by the encoder 102.

The operation of the processing circuit 112 in the encoder 102 is detailed as follows. The determining unit 132 includes a mapping module 152, a storage 154, and an updating module 156. The storage 154 is arranged to provide a mapping table which stores mapping between all candidate syntax element values of the syntax element and a plurality of candidate symbols. As mentioned above, the first data D1 is a syntax element. Therefore, the mapping module 152 searches the mapping table MT for the target symbol S corresponding to a syntax element value carried by the first data D1. The storage 154 further provides a probability table PT which stores occurrence probability indication values for all candidate syntax element values, and the mapping table MT is initialized by the updating module 156 according to an initial setting of the probability table PT, and then selectively updated by the updating module 156 according to the probability table PT which will be updated during the procedure of coding each incoming syntax element value.

Figure 2:
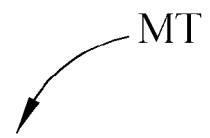
FIG. 2 is a diagram illustrating an exemplary embodiment of a mapping table according to the present invention.
Figure 3:
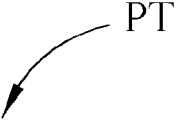
FIG. 3 is a diagram illustrating an exemplary embodiment of a probability table according to the present invention.

Please refer to FIG. 2 in conjunction with FIG. 3. FIG. 2 is a diagram illustrating an exemplary embodiment of the mapping table MT stored in the storage 154 shown in FIG. 1. FIG. 3 is a diagram illustrating an exemplary embodiment of the probability table PT stored in the storage 154 shown in FIG. 1. Suppose that the syntax element D1 has four candidate syntax element values "0", "1", "2", and "3", and the initial occurrence probabilities for the candidate syntax element values "0", "1", "2", and "3" are 0.3, 0.1, 0.4, and 0.2, respectively. Therefore, based on the occurrence probability order, symbol "S0" is assigned to the candidate syntax element value "1", symbol "S1" is assigned to the candidate syntax element value "3", symbol "S2" is assigned to the candidate syntax element value "0", and symbol "S3" is assigned to the candidate syntax element value "2". As shown in FIG. 2, the table entry 201 indexed by an index value "0" stores M[0]=2, the table entry 202 indexed by an index value "1" stores M[1]=0, the table entry 203 indexed by an index value "2" stores M[2]=3, and the table entry 204 indexed by an index value "3" stores M[3]=1. In addition, as shown in FIG. 3, the table entry 301 indexed by the index value "0" stores P[0]=4, the table entry 302 indexed by an index value "1" stores P[1]=3, the table entry 303 indexed by an index value "2" stores P[2]=2, and the table entry 304 indexed by an index value "3" stores P[3]=1. In this exemplary embodiment, the occurrence probability indication values "4", "3", "2", and "1" are stored in the probability table PT in a descending order; however, this is for illustrative purposes only. In an alternative design, the occurrence probability indication values may be stored in the probability table PT in an ascending order. It should be noted that the order of the syntax element values stored in the mapping table MT and the mapping between the symbols and the syntax element values should be adjusted correspondingly. To put it simply, the spirit of the present invention is obeyed as long as the syntax element symbolism is adopted for realizing the universal adaptive entropy coding.

Figure 4:
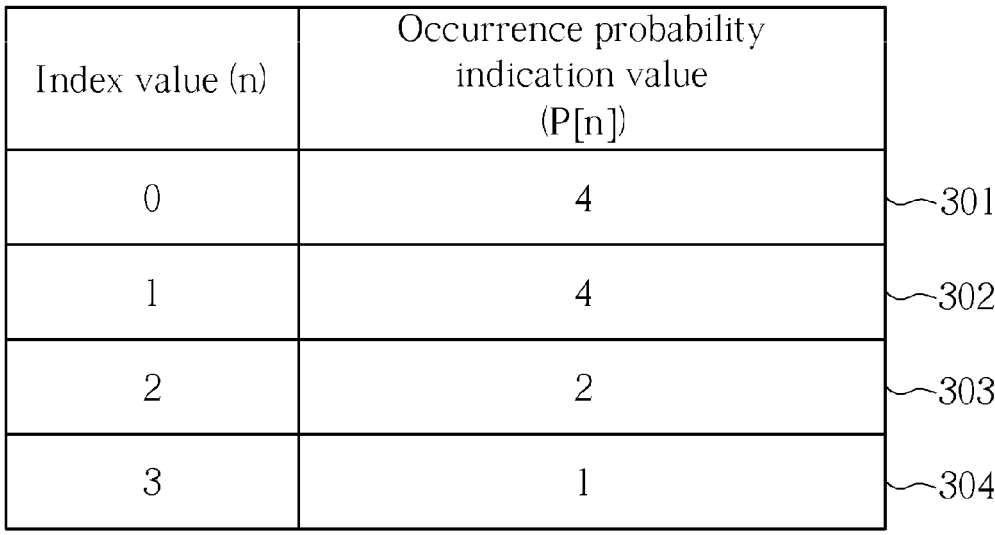
FIG. 4 is a diagram illustrating an exemplary embodiment of an updated probability table according to the present invention.

Each time the mapping module 152 converts a syntax element value of the syntax element (e.g., the first data D1) into the target symbol S by referring to the mapping table MT, the updating module 156 would update the probability table PT and accordingly generates an updated probability table to replace the original probability table. For example, when the syntax element value "0" is processed by the mapping module 152, the updating module 156 adjusts the occurrence probability indication value "3" stored in the table entry 302 indexed by the index value "1" corresponding to the processed syntax element value "0". For example, an increment value d (e.g., d=1) is added to the occurrence probability indication value "3" for updating the occurrence probability indication value stored in the table entry 302, as shown in FIG. 4 which is a diagram illustrating an exemplary embodiment of the updated probability table PT stored in the storage 154.

Figure 5:
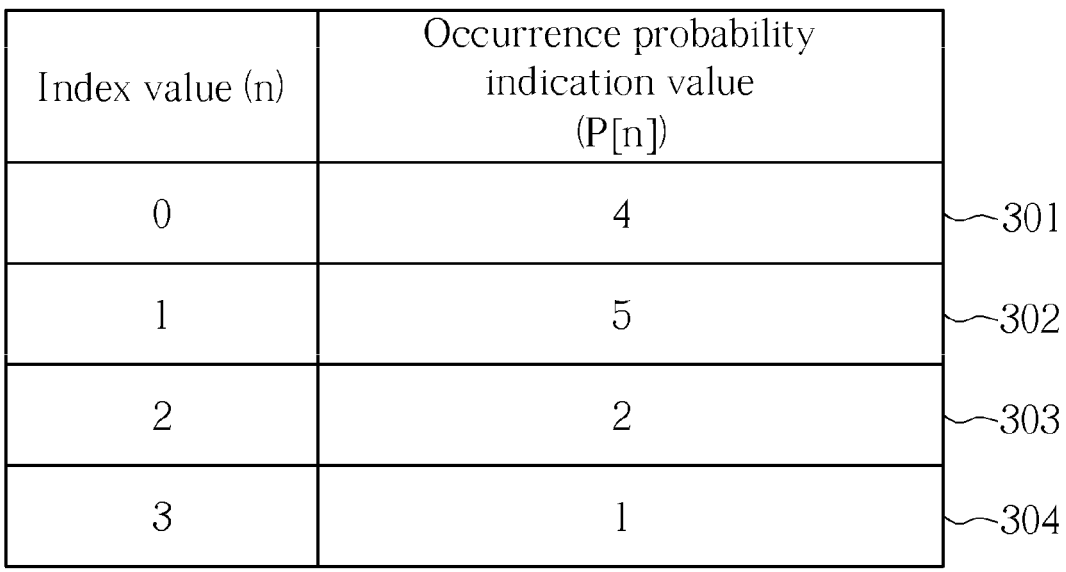
FIG. 5 is a diagram illustrating another exemplary embodiment of the updated probability table according to the present invention.
Figure 7:
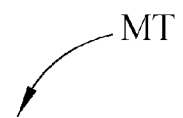
FIG. 7 is a diagram illustrating an exemplary embodiment of an updated mapping table according to the present invention.

After the probability table PT is updated, the updating module 156 selectively updates the current mapping table MT according to the updated probability table PT. In this exemplary embodiment, the updating module 156 checks if an occurrence probability order of occurrence probability indication values stored in sequential table entries 301-304 of the updated probability table PT is a sequential order (e.g., a descending order or an ascending order). As shown in FIG. 4, the occurrence probability indication values stored in sequential table entries 301-304 are "4", "4", "2", and "1" are in a sequential order. Therefore, the updating module 156 does not update the current mapping table MT stored in the storage 154. Suppose that the next syntax element value processed by the mapping module 152 is "0". The updating module 156 adjusts the occurrence probability indication value "4" stored in the table entry 302 indexed by the index value "1" corresponding to the processed syntax element value "0". Please refer to FIG. 5, which is a diagram illustrating another exemplary embodiment of the updated probability table PT stored in the storage 154. The occurrence probability indication value stored in the table entry 302 is adjusted by the increment value d (e.g., d=1) and thus becomes "5". Next, the updating module 156 finds that an occurrence probability order of occurrence probability indication values stored in sequential table entries 301-304 of the updated probability table PT is not a sequential order, which means that the mapping table MT should be updated. In this exemplary embodiment, the updating module 156 swaps the adjusted occurrence probability indication value "5" stored in the table entry 302 indexed by the index value "1" and an occurrence probability indication value "4" stored in the table entry 301 indexed by the index value "0" and swaps a syntax element value "0" stored in the table entry 202 indexed by the index value "1" and a syntax element value "2" stored in the table entry 201 indexed by the index value "0", resulting in an updated probability table as shown in FIG. 6 and an updated mapping table as shown in FIG. 7.

It should be noted that the above-mentioned example only shows one swapping operation applied to the probability table PT/mapping table MT; however, this is for illustrative purposes only. That is, when it is determined that the current mapping table MT should be updated, the updating module 156 does not stop adjusting the probability table PT/mapping table MT until the occurrence probability order of occurrence probability indication values stored in sequential table entries 301-304 of the updated probability table PT has the desired sequential order (e.g., the descending order or the ascending order). The adjustment made to the probability table PT and the mapping table MT may be simply expressed using following pseudo codes.

```
P[n]=P[n]+d;
i=n;
while (i>0 && P[i]>P[i-1])
{
swap(P[i], P[i-1]);
swap(M[i], M[i-1]);
i--;
}
```

As mentioned above, the updating module 156 increases one of the occurrence probability indication values stored in the probability table PT each time a syntax element value is processed. However, each occurrence probability indication value is generally stored by a fixed number of bits in the storage 154. For example, one byte is used for recording one occurrence probability indication value. Thus, the maximum value that one byte can store or represent is 255 (i.e., $2^8-1$). To avoid the undesired arithmetic overflow (i.e., a condition that occurs when a calculation produces a result that is greater than what a given byte can store or represent), the updating module 156 is further arranged to decrease occurrence probability indication values stored in all table entries of the probability table PT when the adjusted occurrence probability indication value (e.g., the largest occurrence probability indication value P[0]) reaches a predetermined threshold (e.g., 255). For example, P[n]=a*P[n] for each index value n, where 0<a<1.

Please refer to FIG. 1 again. The processing unit 134 of the encoder 102 acts as an entropy coding circuit for generating the entropy-coded result (e.g., the second data D2) according to the target symbol S determined by the preceding determining unit 132. For example, a codeword may be a variable length code or a binarization result in the arithmetic coding. Therefore, a shorter codeword would be assigned to a symbol with higher occurrence probability. In addition, the coding method employed by the processing unit 134 may be adaptively adjusted by referring to the probability table PT. For example, the processing unit 134 selects a coding rule (e.g., a Huffman code table) from a plurality of candidate coding rules according to a probability distribution of the probability table PT, and generates the entropy-coded result of the syntax element according to the selected coding rule. To put it another way, different probability distribution (i.e., different combinations of the occurrence probability indication values stored in table entries of the probability table PT) will result in different optimal coding methods employed by the processing unit 134.

Besides, the probability may be conditional probability. As the current syntax element value to be coded may be likely identical to a previously coded syntax element value, the mapping table and probability table referred to for coding the previous syntax element value may be more suitable for coding the current syntax element value for optimum coding efficiency, the determining unit 132 therefore determines which mapping table and which probability table should be used by referring to a coding context which is derived from the previously coded syntax element. In a case where the syntax element has four possible syntax element values, there are four coding contexts, implying that there are four candidate mapping tables (which are initialized by different settings respectively) and four candidate probability tables (which are initialized by different settings respectively) correspondingly. In other words, the storage 154 provides the mapping table MT required by the mapping module 152 by selecting the mapping table MT from a plurality of candidate mapping tables according to the coding context, and provides the probability table PT required by the mapping module 152 by selecting the probability table PT from a plurality of candidate probability tables according to the coding context. Thus, the selectively updated mapping table and the updated probability table generated due to coding the previous syntax element value will be used for coding the current syntax element value. It should be noted that selecting the mapping table and probability table may be performed each time a next syntax element value to be encoded is received. Alternatively, selecting the mapping table and probability table may be performed only when a predetermined criterion is satisfied. For example, the predetermined criterion is satisfied if a predetermined time period counted by a timer expires or the number of encoded syntax element values reaches a threshold value. However, this is for illustrative purposes only, and is not meant to be a limitation to the present invention.

It should be noted that the determining unit 142 of the decoder 104 performs an inverse operation corresponding to an operation performed by the processing unit 134 of the encoder 102, and the processing unit 144 of the decoder 104 performs an inverse operation corresponding to an operation performed by the determining unit 132 of the encoder 102. Taking the determining unit 142 for example, it acts as an entropy decoding circuit and determines the target symbol S' corresponding to the first data D1', wherein the determining unit 142 may select a decoding rule from a plurality of candidate coding rules according to a probability distribution of the probability table PT stored in the storage 164, and determine the target symbol S' corresponding to the entropy-coded result (i.e., the first data D1') of the syntax element (i.e., the second data D2') according to the selected decoding rule. In addition, selecting the mapping table and the probability table is performed each time a previous syntax element value is decoded, or is performed only when a predetermined criterion is satisfied. Regarding the processing unit 144, it may generate the second data D2' corresponding to the determined target S' by referring to the mapping table MT which is selectively updated according to the probability table PT, wherein the mapping module 162 searches the mapping table MT in the storage 164 for a syntax element value corresponding to the determined target symbol S', and then the updating module 166 updates the probability table PT and selectively updates the mapping table MT according to the updated probability table PT, and further decreases occurrence probability indication values stored in all table entries of the updated probability table PT when the adjusted occurrence probability indication value (e.g., the largest occurrence probability indication value) reaches a predetermined threshold (e.g., 255). As a person skilled in the art can readily understand details of the processing unit 144 and the determining unit 142 of the decoder 104 after reading above paragraphs directed to the determining unit 132 and the processing unit 134 of the encoder 102, further description is omitted here for brevity.

Figure 8:
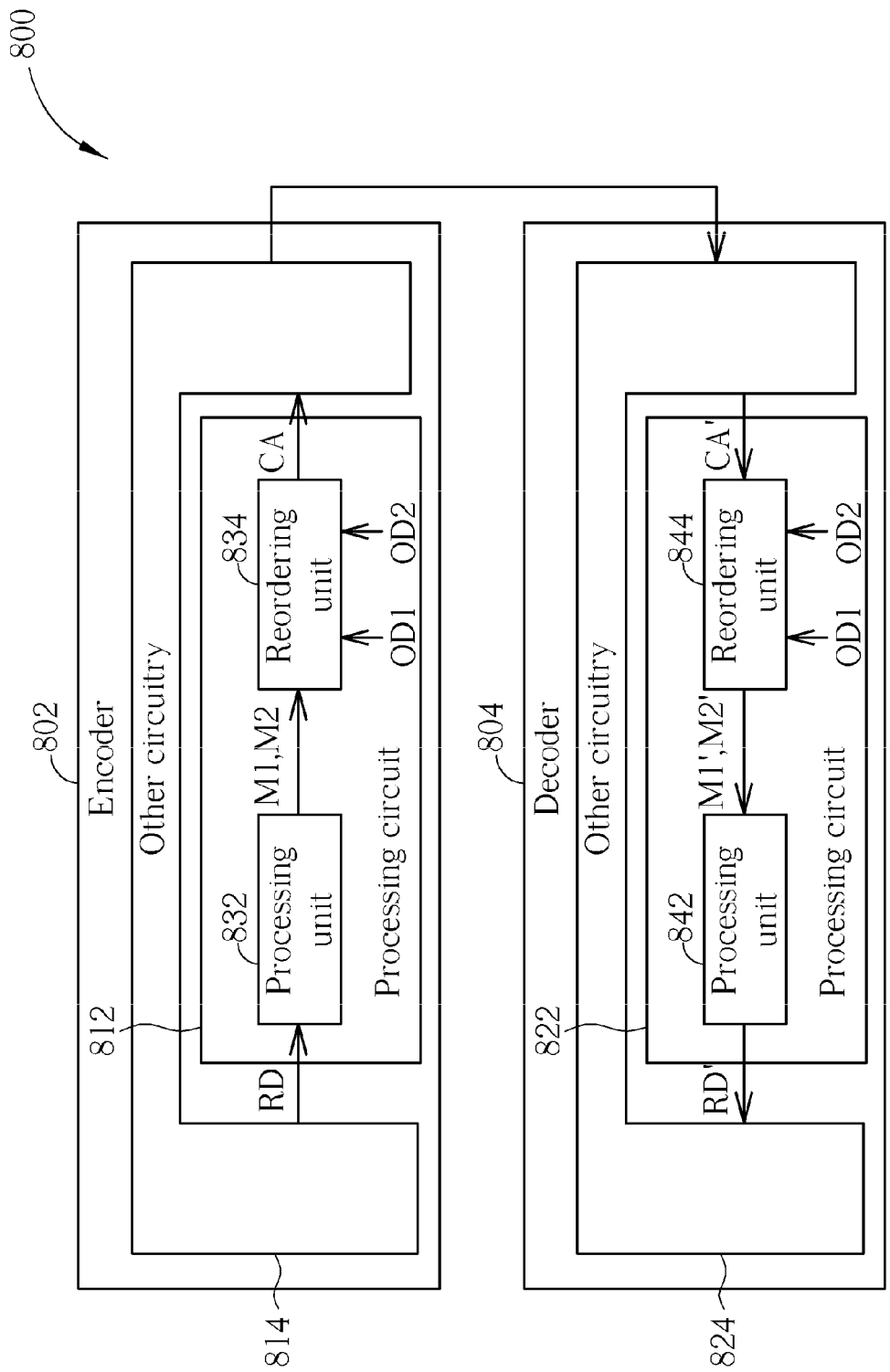
FIG. 8 is a block diagram illustrating an image processing system according to another exemplary embodiment of the present invention.

FIG. 8 is a block diagram illustrating an image processing system according to another exemplary embodiment of the present invention. The image processing system 800 includes an encoder 802 and a decoder 804, wherein the encoder 802 includes a processing circuit 812 and other circuitry 814 for realizing the designated functionality of the encoder 802, and the decoder 804 includes a processing circuit 822 and other circuitry 824 for realizing the designated functionality of the decoder 804. In this exemplary embodiment, the processing circuit 812 of the encoder 802 is used for converting prediction residue data RD into a one-dimensional coefficient array CA, and includes a processing unit 832 and a reordering unit 834. Regarding the processing circuit 822 of the decoder 804 used for converting a one-dimensional coefficient array CA' into prediction residue data RD', it includes a processing unit 842 and a reordering unit 844. Ideally, when the coefficient array CA' is identical to the coefficient array CA, the prediction residue data RD' generated from the processing circuit 822 in the decoder 804 would be identical to the prediction residue data RD fed into the processing circuit 812 of the encoder 802.

Regarding the processing circuit 812 of the encoder 802, the processing unit 832 is used for generating a plurality of two-dimensional coefficient matrixes (e.g., M1 and M2) by performing a plurality of image processing operations upon a plurality of portions of the prediction residue data RD, respectively, wherein the image processing operations include different transforms, respectively, and the prediction residue data RD corresponds to a difference between a block to be encoded and a prediction block under a single prediction mode. For example, other circuitry 814 may include an intra-prediction unit (not shown) for finding one prediction block under one of a plurality of intra-prediction modes under 4×4/8×8/16×16 intra-prediction, and the difference between the found prediction block and a 4×4/8×8/16×16 block to be encoded is generated to the processing circuit 812 as the prediction residue data RD. In addition, the processing unit 832 is arranged to perform a block-based transform, such as a Discrete Cosine Transform (DCT), upon a first portion of the prediction residue data RD to thereby generate a DCT coefficient matrix, and then perform quantization upon the coefficients of the DCT coefficient matrix to thereby generate the coefficient matrix M1, and the processing unit 832 is further arranged to perform another block-based transform, such as a Karhunen-Loeve Transform (KLT), upon a second portion of the same prediction residue data RD to thereby generate a KLT coefficient matrix, and then perform quantization upon the coefficients of the KLT coefficient matrix to thereby generate the coefficient matrix M2. The following reordering unit 834 is implemented for generating the coefficient array CA by applying a plurality of different scanning orders (e.g., OD1 and OD2) to the different coefficient matrixes (e.g., M1 and M2), respectively.

Regarding the processing circuit 822 of the decoder 804, the reordering unit 844 is used for generating a plurality of coefficient matrixes (e.g., M1' and M2') by applying a plurality of different scanning orders (e.g., OD1 and OD2) to a plurality of portions of the coefficient array CA', respectively. That is, the scanning order OD1 is used by the reordering unit 844 for converting a first portion of the one-dimensional coefficient array CA' into the two-dimensional coefficient matrix M1', and the scanning order OD2 is used by the reordering unit 844 for converting a second portion of the one-dimensional coefficient array CA' into the two-dimensional coefficient matrix M2'. The processing unit 842 is used for generating the prediction residue data RD' by performing a plurality of image processing operations upon the coefficient matrixes M1' and M2', respectively, wherein the image processing operations include different inverse transforms, respectively. For example, the coefficient matrix M1' is consisted of quantized DCT coefficients, and the coefficient matrix M2' is consisted of quantized KLT coefficients. Therefore, the processing unit 842 is arranged to perform inverse quantization upon the coefficient matrixes M1' and M2', and then perform inverse block-based transforms, such as an inverse DCT and an inverse KLT, upon the inverse quantization results of the coefficient matrixes M1' and M2' for generating the prediction residue data RD'.

Briefly summarized, the aforementioned embodiment of the present invention proposes an innovative coding method which transforms a prediction residue generated under a single prediction mode into multiple coefficient matrixes by using a plurality of different transforms (e.g., DCT and KLT), and further proposes an innovative decoding method which multiple coefficient matrixes into a prediction residue corresponding to a single prediction mode by using a plurality of different inverse transforms (e.g., inverse DCT and inverse KLT).

Figure 9:
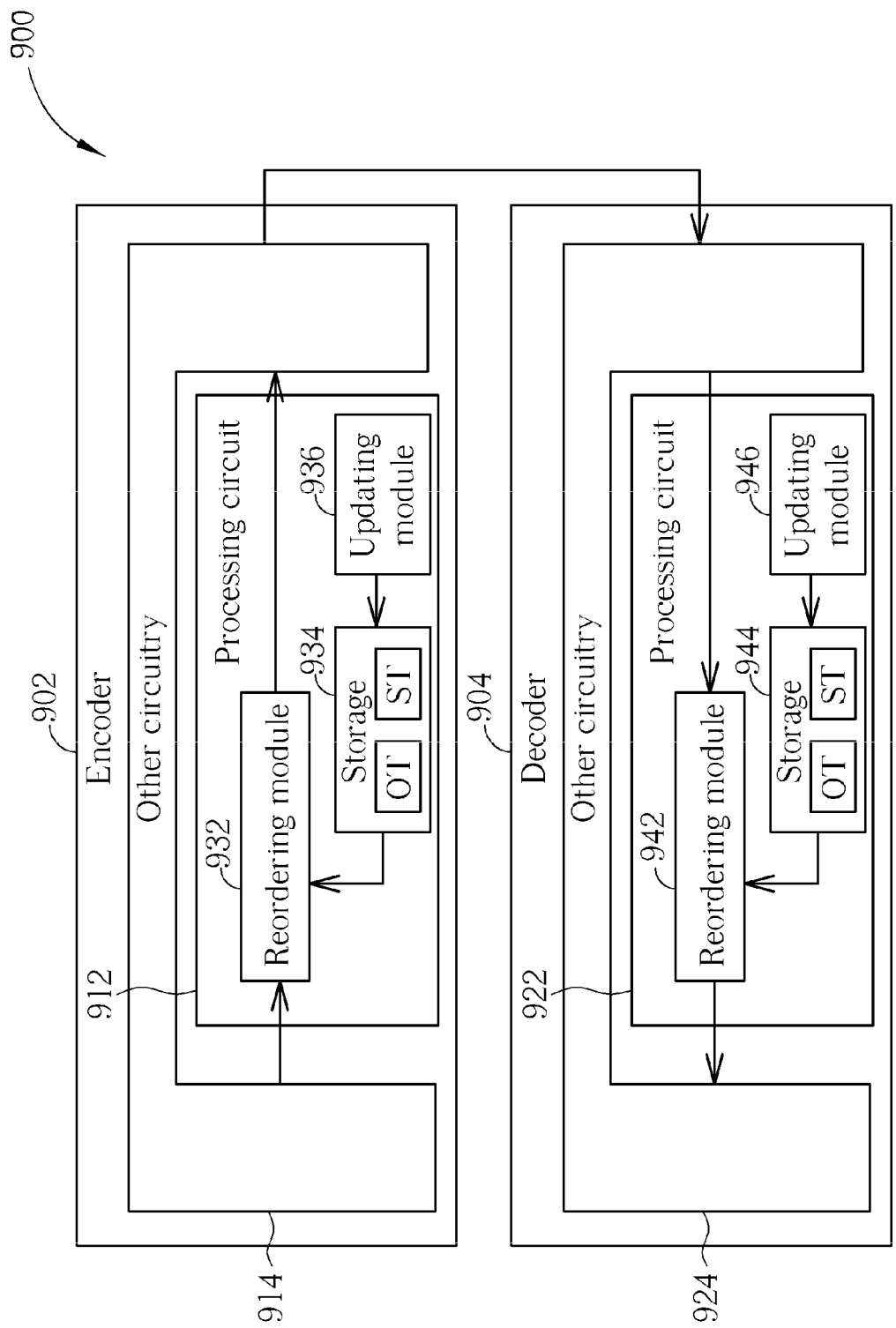
FIG. 9 is a block diagram illustrating an image processing system according to yet another exemplary embodiment of the present invention.

FIG. 9 is a block diagram illustrating an image processing system according to yet another exemplary embodiment of the present invention. The image processing system 900 includes an encoder 902 and a decoder 904, wherein the encoder 902 includes a processing circuit 912 and other circuitry 914 for realizing the designated functionality of the encoder 902, and the decoder 904 includes a processing circuit 922 and other circuitry 924 for realizing the designated functionality of the decoder 904. In this exemplary embodiment, the processing circuit 912 may be used for serving as the reordering unit 834 shown in FIG. 8, and the processing circuit 922 may be used for serving as the reordering unit 844 shown in FIG. 8. As shown in FIG. 9, the processing circuit 912 of the encoder 902 includes a reordering module 932, a storage 934 coupled to the reordering module 932, and an updating module 936 coupled to the storage 934, and the processing circuit 922 of the decoder 904 includes a reordering module 942, a storage 944 coupled to the reordering module 942, and an updating module 946 coupled to the storage 944.

The operation of the processing circuit 912 in the encoder 902 is detailed as follows. The reordering module 932 is used for converting a two-dimensional coefficient matrix (e.g., a DCT/KLT coefficient matrix) into a one-dimensional coefficient array by referring to a scanning order recorded by an order table OT. In this embodiment, the storage 934 is used for providing the order table OT which records the scanning order by storing a plurality of position values indexed by a plurality of scanning index values, respectively, wherein the position values are indicative of positions in a coefficient matrix corresponding to a specific transform (e.g., DCT/KLT). Each time one coefficient in the coefficient matrix is processed according to the scanning order recorded by the order table OT, the updating module 936 determines whether to update the order table OT. As shown in FIG. 9, the storage 934 further provides a statistic table ST which stores a plurality of statistic values indexed by the scanning index values, respectively, wherein each statistic value records how many times a corresponding position of the coefficient matrix holds a non-zero coefficient. More specifically, the updating module 936 initializes the statistic table ST and the order table OT by predetermined values, and then selectively updating the order table OT by referring to the statistic table ST which will be updated each time a non-zero coefficient of the coefficient matrix is processed.

Figure 10:
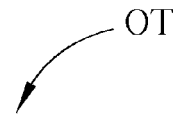
FIG. 10 is a diagram illustrating an exemplary embodiment of an order table according to the present invention.
Figure 11:
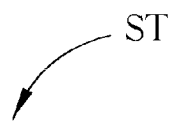
FIG. 11 is a diagram illustrating an exemplary embodiment of a statistic table according to the present invention.

Please refer to FIG. 10 in conjunction with FIG. 11. FIG. 10 is a diagram illustrating an exemplary embodiment of the order table OT stored in the storage 934 shown in FIG. 9. FIG. 11 is a diagram illustrating an exemplary embodiment of the statistic table ST stored in the storage 934 shown in FIG. 9. Suppose that the statistic values for the positions (0,0), (1,0), (0,1), and (0,2) are "10", "10", "8", and "7" in a sequential order (e.g., a descending order). As shown in FIG. 10, the table entry 1002 indexed by a scanning index value "0" stores OT[0]=(0,0), the table entry 1004 indexed by a scanning index value "1" stores OT[1]=(1,0), the table entry 1006 indexed by a scanning index value "2" stores OT[2]=(0,1), and the table entry 1008 indexed by an index value "3" stores OT[3]=(0,2). As shown in FIG. 11, the table entry 1102 indexed by the scanning index value "0" stores ST[0]=10, the table entry 1104 indexed by the scanning index value "1" stores ST[1]=10, the table entry 1106 indexed by the scanning index value "2" stores ST[2]=8, and the table entry 1108 indexed by the scanning index value "3" stores ST[3]=7. In this exemplary embodiment, the statistic values "10", "10", "8", and "7" are stored in the statistic table ST in an descending order; however, this is for illustrative purposes only. In an alternative design, the statistic values may be stored in the statistic table ST in an ascending order. It should be noted that the mapping between the scanning index values and the position values in the order table OT should be adjusted correspondingly. To put it simply, the spirit of the present invention is obeyed as long as the scanning order is adaptively updated each time a non-zero coefficient is encountered during the reordering operation performed by the reordering module 932.

Each time the reordering module 932 processes one non-zero coefficient in the coefficient matrix according to the scanning order recorded by the order table OT, the updating module 936 would update the statistic table ST and accordingly generates an updated statistic table to replace the original statistic table. For example, when a non-zero coefficient at the position (1,0) is processed by the reordering module 932, the updating module 936 adjusts the statistic value "10" stored in the table entry 1104 indexed by the index value "1" corresponding to the processed non-zero coefficient. For example, an increment value d (e.g., d=1) is added to the statistic value "10" for updating the statistic value stored in the table entry 1104, as shown in FIG. 12 which is a diagram illustrating an exemplary embodiment of the updated statistic table ST stored in the storage 934.

Figure 13:
FIG. 13 is a diagram illustrating another exemplary embodiment of the updated statistic table according to the present invention.
Figure 14:
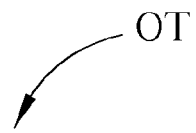
FIG. 14 is a diagram illustrating an exemplary embodiment of an updated order table according to the present invention.

After the statistic table ST is updated, the updating module 936 would selectively update the current order table OT by referring to the updated statistic table ST. In this exemplary embodiment, the updating module 936 checks if an order of statistic values stored in sequential table entries of the updated statistic table ST is a sequential order (e.g., a descending order or an ascending order). As shown in FIG. 12, the statistic values stored in sequential table entries 1102-1108 are "10", "11", "8", and "7" are in a non-sequential order, which means that the order table OT should be updated. In this exemplary embodiment, the updating module 936 swaps the adjusted statistic value "11" stored in the table entry 1104 indexed by the index value "1" and a statistic value "10" stored in the table entry 1102 indexed by the index value "0" and swaps a position value (1,0) stored in the table entry 1004 indexed by the index value "1" and a position value (0,0) stored in the table entry 1002 indexed by the index value "0", resulting in an updated statistic table as shown in FIG. 13 and an updated order table as shown in FIG. 14.

It should be noted that the above-mentioned example only shows one swapping operation applied to the statistic table ST/order table OT; however, this is for illustrative purposes only. That is, when it is determined that the order table OT should be updated, the updating module 936 does not stop adjusting the statistic table ST/order table OT until the order of statistic values stored in sequential table entries of the updated statistic table ST has the desired sequential order (e.g., the descending order or the ascending order). The adjustment made to the statistic table ST and the order table OT may be simply expressed using following pseudo codes.

```
ST[k]=ST[k]+d;
m=k;
while (m>0 && ST[m]>ST[m-1])
{
swap(ST[m], ST[m-1]);
swap(OT[m], OT[m-1]);
m--;
}
```

As mentioned above, the updating module 936 increases one of the statistic values stored in the statistic table ST each time a non-zero coefficient is processed. However, each statistic value is stored by a fixed number of bits in the storage 934. For example, one byte is used for recording one statistic value. Thus, the maximum value that one byte can record or represent is 255 (i.e., $2^8-1$). To avoid the undesired arithmetic overflow (i.e., a condition that occurs when a calculation produces a result that is greater than what a given byte can store or represent), the updating module 936 is further arranged to decrease statistic values stored in all table entries of the statistic table ST when the adjusted statistic value (e.g., the largest statistic value ST[0]) reaches a predetermined threshold (e.g., 255). For example, ST[n]=a*ST[n] for each scanning index value n, where 0<a<1.

It should be noted that the processing circuit 922 of the decoder 904 performs an inverse operation corresponding to an operation performed by the processing circuit 912 of the encoder 902. That is, the reordering module 942 is used for converting a one-dimensional coefficient array into a two-dimensional coefficient matrix (e.g., a DCT/KLT coefficient matrix) by referring to a scanning order recorded by an order table OT. The storage 944 is used for providing the desired order table OT which records the scanning order by storing a plurality of position values indexed by a plurality of scanning index values, respectively, wherein the position values are indicative of positions in a coefficient matrix corresponding to a specific transform (e.g., DCT/KLT). Each time one coefficient in the coefficient array is processed according to the scanning order recorded by the order table OT, the updating module 936 determines whether to update the order table OT. As shown in FIG. 9, the storage 944 further provides a statistic table ST which stores a plurality of statistic values indexed by the scanning index values, respectively, wherein each statistic value records how many times a corresponding position of the coefficient matrix holds a non-zero coefficient. More specifically, the updating module 946 initializes the statistic table ST and the order table OT by predetermined values, and then selectively updating the order table OT by referring to the statistic table ST which will be updated each time a non-coefficient of the coefficient array is processed. In addition, the updating module 946 further decreases statistic values stored in all table entries of the updated statistic table ST when the adjusted statistic value (e.g., the largest statistic value) reaches a predetermined threshold (e.g., 255). As a person skilled in the art can readily understand details of the processing circuit 922 of the decoder 904 after reading above paragraphs directed to the processing circuit 912 of the encoder 902, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of converting first data into second data, comprising:

determining a target symbol corresponding to the first data by utilizing a determining unit adaptively according to occurrence probability of candidate syntax element values of a syntax element referring to a probability table which stores occurrence probability indication values for all syntax element values, wherein the first data is the syntax element and the occurrence probability indication values are integer; wherein determining the target symbol corresponding to the first data comprises:

providing a mapping table which stores mapping between all candidate syntax element values of the syntax element and a plurality of candidate symbols;

searching the mapping table for the target symbol corresponding to a syntax element value of the syntax element; and generating an updated probability table by updating the probability table, wherein comprising:

adjusting an occurrence probability indication value stored in a first table entry indexed by a first index value corresponding to the syntax element value of the syntax element; and selectively updating the mapping table according to the updated probability table, wherein when an occurrence probability order of occurrence probability indication values stored in sequential table entries of the updated probability table is not a sequential order, swapping the adjusted occurrence probability indication value stored in the first table entry of the updated probability table that is indexed by the first index value and an occurrence probability indication value stored in a second table entry of the updated probability table that is indexed by a second index value, and swapping a syntax element value stored in a first table entry of the mapping table that is indexed by the first index value and a syntax element value stored in a second table entry of the mapping table that is indexed by the second index value, when the adjusted occurrence probability indication value stored in the first table entry of the updated probability table reaches a predetermined threshold, decreasing occurrence probability indication values stored in all table entries of the updated probability table; and generating the second data corresponding to the determined target symbol, wherein the second data is an entropy-coded result of the syntax element.

2. The method of claim 1, wherein generating the second data corresponding to the determined target symbol comprises:

selecting a coding rule from a plurality of candidate coding rules according to a probability distribution of the probability table; and generating the entropy-coded result of the syntax element according to the coding rule.

3. The method of claim 1, wherein:

providing the mapping table comprises:
selecting the mapping table from a plurality of candidate mapping tables according to a coding context, wherein the coding context is derived from a previously coded syntax element value; and providing the probability table comprises:
selecting the probability table from a plurality of candidate probability tables according to the coding context.

4. The method of claim 3, wherein selecting the mapping table and selecting the probability table are performed each time a next syntax element value to be encoded is received.

5. The method of claim 3, wherein selecting the mapping table and selecting the probability table are performed only when a predetermined criterion is satisfied.

6. A method of converting first data into second data, comprising:

determining a target symbol corresponding to the first data by utilizing a determining unit, the first data is an entropy-coded result of the syntax element; and generating the second data corresponding to the determined target symbol, wherein the second data is the syntax element, wherein generating the second data corresponding to the determined target symbol comprising:

providing a mapping table which stores mapping between all candidate syntax element values of the syntax element and a plurality of candidate symbols; and searching the mapping table for a syntax element value of the syntax element corresponding to the determined target symbol;

providing a probability table which stores occurrence probability indication values for all candidate syntax element values; and generating an updated probability table by updating the probability table, comprising:

adjusting an occurrence probability indication value stored in a first table entry indexed by a first index value corresponding to the syntax element value of the syntax element; and selectively updating the mapping table according to the updated probability table, when an order of occurrence probability indication values stored in sequential table entries of the updated probability table is not a sequential order, swapping the adjusted occurrence probability indication value stored in the first table entry of the updated probability table that is indexed by the first index value and an occurrence probability indication value stored in a second table entry of the updated probability table that is indexed by a second index value, and swapping a syntax element value stored in a first table entry of the mapping table that is indexed by the first index value and a syntax element value stored in a second table entry of the mapping table that is indexed by the second index value, when the adjusted occurrence probability indication value stored in the first table entry of the updated probability table reaches a predetermined threshold, decreasing occurrence probability indication values stored in all table entries of the updated probability table.

7. The method of claim 6, wherein determining the target symbol corresponding to the first data comprises:

selecting a decoding rule from a plurality of candidate coding rules according to a probability distribution of the probability table; and determining the target symbol corresponding to the entropy-coded result of the syntax element according to the decoding rule.

8. The method of claim 6, wherein:

providing the mapping table comprises:
selecting the mapping table from a plurality of candidate mapping tables according to a decoding context, wherein the decoding context is derived from a previously decoded syntax element value; and providing the probability table comprises:
selecting the probability table from a plurality of candidate probability tables according to the decoding context.

9. The method of claim 8, wherein selecting the mapping table and selecting the probability table are performed each time a previous syntax element value is decoded.

10. The method of claim 8, wherein selecting the mapping table and selecting the probability table are performed only when a predetermined criterion is satisfied.

11. A method of recording a scanning order for a transform, comprising:

providing an order table which records the scanning order by storing a plurality of position values indexed by a plurality of scanning index values, respectively, wherein the position values are indicative of positions in a coefficient matrix corresponding to the transform;

providing a statistic table which stores a plurality of statistic values indexed by the scanning index values, respectively, wherein each statistic value records how many times a corresponding position of the coefficient matrix holds a non-zero coefficient; and each time one coefficient is processed according to the scanning order recorded by the order table, determining whether to update the order table by utilizing an updating module, wherein determining whether to update the order table by utilizing an updating module comprising checking if the processed coefficient is the non-zero coefficient; when the processed coefficient is the non-zero coefficient, adjusting a statistic value stored in a first table entry indexed by a first scanning index value corresponding to the processed coefficient to generate an updated statistic table, and selectively updating the order table by referring to the updated statistic table, wherein updating the statistic table to generate the updated statistic table further comprises: when the adjusted statistic value stored in the first table entry of the updated probability table reaches a predetermined threshold, decreasing statistic values stored in all table entries of the updated statistic table.

12. The method of claim 11, wherein selectively updating the order table by referring to the updated statistic table comprises:

when an order of statistic values stored in sequential table entries of the updated statistic table is not a sequential order, swapping the adjusted statistic value stored in the first table entry of the updated statistic table that is indexed by the first scanning index value and a statistic value stored in a second table entry of the updated statistic table that is indexed by a second index value, and swapping a position value stored in a first table entry of the order table that is indexed by the first scanning index value and a position value stored in a second table entry of the order table that is indexed by the second scanning index value.

* * * * *